(12) United States Patent
Uno

(10) Patent No.: US 10,063,050 B2
(45) Date of Patent: Aug. 28, 2018

(54) POWER SUPPLY SYSTEM AND POWER SUPPLY APPARATUS

(71) Applicant: Murata Manufacturing Co., Ltd., Nagaokakyo-shi, Kyoto-fu (JP)

(72) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 414 days.

(21) Appl. No.: 15/064,706

(22) Filed: Mar. 9, 2016

(65) Prior Publication Data

US 2016/0190803 A1 Jun. 30, 2016

Related U.S. Application Data

(63) Continuation of application No. PCT/JP2014/075985, filed on Sep. 30, 2014.

(30) Foreign Application Priority Data

Oct. 2, 2013 (JP) .................................. 2013-207253

(51) Int. Cl.
*H02J 1/00* (2006.01)
*H02M 3/158* (2006.01)
*H02J 1/10* (2006.01)

(52) U.S. Cl.
CPC ................ *H02J 1/00* (2013.01); *H02J 1/102* (2013.01); *H02M 3/1584* (2013.01)

(58) Field of Classification Search
CPC .......................... H02J 1/102; H02J 2001/104
See application file for complete search history.

(56) References Cited

U.S. PATENT DOCUMENTS 5,079,686 A 1/1992 Vinciarelli
2003/0137856 A1* 7/2003 Sheng ..................... H02J 1/102
363/72

FOREIGN PATENT DOCUMENTS

JP 4-229075 A 8/1992
JP 7-95763 A 4/1995
(Continued)

OTHER PUBLICATIONS

EPO translated claims for JP5999271. Printed from ESPACENET, Jun. 7, 2018.*
(Continued)

*Primary Examiner* — Fritz M Fleming
(74) *Attorney, Agent, or Firm* — Keating & Bennett, LLP (57) ABSTRACT

A power supply system includes a plurality of power supply apparatuses whose inputs and outputs are respectively connected in parallel with one another. The output of each of the plurality of power supply apparatuses is wired-OR connected to a synchronization pulse bus line in an open collector structure or an open drain structure. The plurality of power supply apparatuses each include a synchronization pulse generator generating a synchronization pulse for synchronization of a switching cycle, and a switching control circuit, connected to the synchronization pulse bus line, performing switching control of a switch device in synchronization with a signal of the synchronization pulse bus line. There is no distinction between a master power supply apparatus and a slave power supply apparatus in the plurality of power supply apparatuses. Further, generation of noise due to a transmission line for a synchronization signal is avoided.

19 Claims, 7 Drawing Sheets

(56) References Cited

FOREIGN PATENT DOCUMENTS

| JP | 9-163728 A | 6/1997 |
| JP | 10-108461 A | 4/1998 |
| JP | 2011-259530 A | 12/2011 |
| JP | 2013-90519 A | 5/2013 |

OTHER PUBLICATIONS

Official Communication issued in corresponding Japanese Patent Application No. 2015-540489, dated May 10, 2016.
Official Communication issued in corresponding Application PCT/JP2014/075985, dated Dec. 22, 2014.

* cited by examiner

POWER SUPPLY SYSTEM AND POWER SUPPLY APPARATUS

BACKGROUND OF THE INVENTION

1. Field of the Invention

The present invention relates to a power supply system including a plurality of power supply apparatuses whose inputs and outputs are respectively connected in parallel with one another.

2. Description of the Related Art

A power supply system in which a plurality of power supply apparatuses are connected in parallel is used to realize a high-output and a redundant operation. When a plurality of power supply apparatuses are used, in order to suppress an interference phenomenon (switching beat) due to the operations of the plurality of switching operations, the switching operations of the power apparatuses need to be synchronized with one another. Japanese Unexamined Patent Application Publication No. 9-163728, for example, discloses a configuration in which a slave side receives a synchronization signal from a master side to synchronize the operation timings and frequencies of the switching operations of switching power supply circuits. Japanese Unexamined Patent Application Publication No. 2011-259530 discloses a configuration in which power supply apparatuses are driven such that switching frequencies are synchronized with one another and so as to have different phase angles among them, by transmitting synchronization signals having shifted phases from a control apparatus functioning as a master to slaves.

In the power supply systems disclosed in Japanese Unexamined Patent Application Publication No. 9-163728 and Japanese Unexamined Patent Application Publication No. 2011-259530, a master power supply apparatus and slave power supply apparatuses need to be provided. Since a synchronization signal for synchronizing the timings of switching operations and frequencies has a high frequency, wiring of a transmission line for the synchronization signal makes the transmission line a source of noise generation and a portion of noise reception. Hence appropriate measures for this problem are required.

SUMMARY OF THE INVENTION

Preferred embodiments of the present invention provide a power supply system and a power supply apparatus which do not require that a master power supply apparatus and slave power supply apparatuses be provided separately and which solve the problem of noise caused by a transmission line for a synchronization signal.

A power supply system according to a preferred embodiment of the present invention includes a plurality of power supply apparatuses whose inputs and outputs are respectively connected in parallel with one another. The plurality of power supply apparatuses each include: a converter performing power conversion; a synchronization pulse generator generating a synchronization pulse for synchronization of a switching cycle; and a switching control circuit performing switching control of a switch device in synchronization with the synchronization pulse. The power supply system includes: a synchronization pulse bus line connecting the synchronization pulse generators and synchronization signal inputs of the switching control circuits to one another. The synchronization pulse generators are wired-OR connected to the synchronization pulse bus line in an open collector structure or an open drain structure. The synchronization pulse generators each generate the synchronization pulse in synchronization with rising or falling of the synchronization pulse bus line. A cycle time of the synchronization pulse is an integer multiple of a cycle time of the switching cycle.

With the structure described above, without distinguishing between master and slave, synchronized parallel operation of the power supply apparatuses is realized. Since the synchronization pulse is able to be made to have a frequency lower than or equal to a switching frequency, the problem of distortion of a signal and generation/reception of noise due to the synchronization pulse bus line is alleviated.

Preferably, the synchronization pulse generator, when the switching control circuit is synchronized with the synchronization pulse output from the pulse generator of another power supply apparatus, sets a generation cycle of the synchronization pulse to be longer than the cycle of a synchronization pulse output from the synchronization pulse generator of the other power supply apparatus. As a result, the power supply apparatuses, although having the same configuration, are able to be divided into a master and slaves in operations.

The switching control circuit of at least one power supply apparatus of the plurality of power supply apparatuses may set a fixed delay time between a rising or falling edge of the synchronization pulse and switching of the switch device. As a result, a multiphase operation is realized.

A power supply apparatus according to a preferred embodiment of the present invention is one of a plurality of power supply apparatuses whose inputs and outputs are respectively connected in parallel with one another, thus defining a power supply system. The power supply apparatus includes: a converter performing power conversion; a synchronization pulse generator generating a synchronization pulse for synchronization of a switching cycle; and a switching control circuit performing switching control of a switch device in synchronization with the synchronization pulse. The power supply system includes: a synchronization pulse bus line connecting the synchronization pulse generators and synchronization signal inputs of the switching control circuits to one another. The synchronization pulse generators are wired-OR connected to the synchronization pulse bus line in an open collector structure or an open drain structure. The synchronization pulse generators each generate the synchronization pulse in synchronization with rising or falling of the synchronization pulse bus line. A cycle time of the synchronization pulse is an integer multiple of a cycle time of the switching cycle.

According to various preferred embodiments of the present invention, without distinguishing between master and slave, synchronized parallel operation of the power supply apparatuses is realized. Since the synchronization pulse is able to be made to have a frequency lower than or equal to a switching frequency, the problem of distortion of a signal and generation/reception of noise due to the synchronization pulse bus line is alleviated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a plurality of preferred embodiments for realizing the present invention will be described by using several specific examples with reference to the drawings. In the figures, identical portions are denoted by the same symbols. The preferred embodiments are examples, and partial replacement or combinations of configurations illustrated in different preferred embodiments are possible.

First Preferred Embodiment

Figure 1:
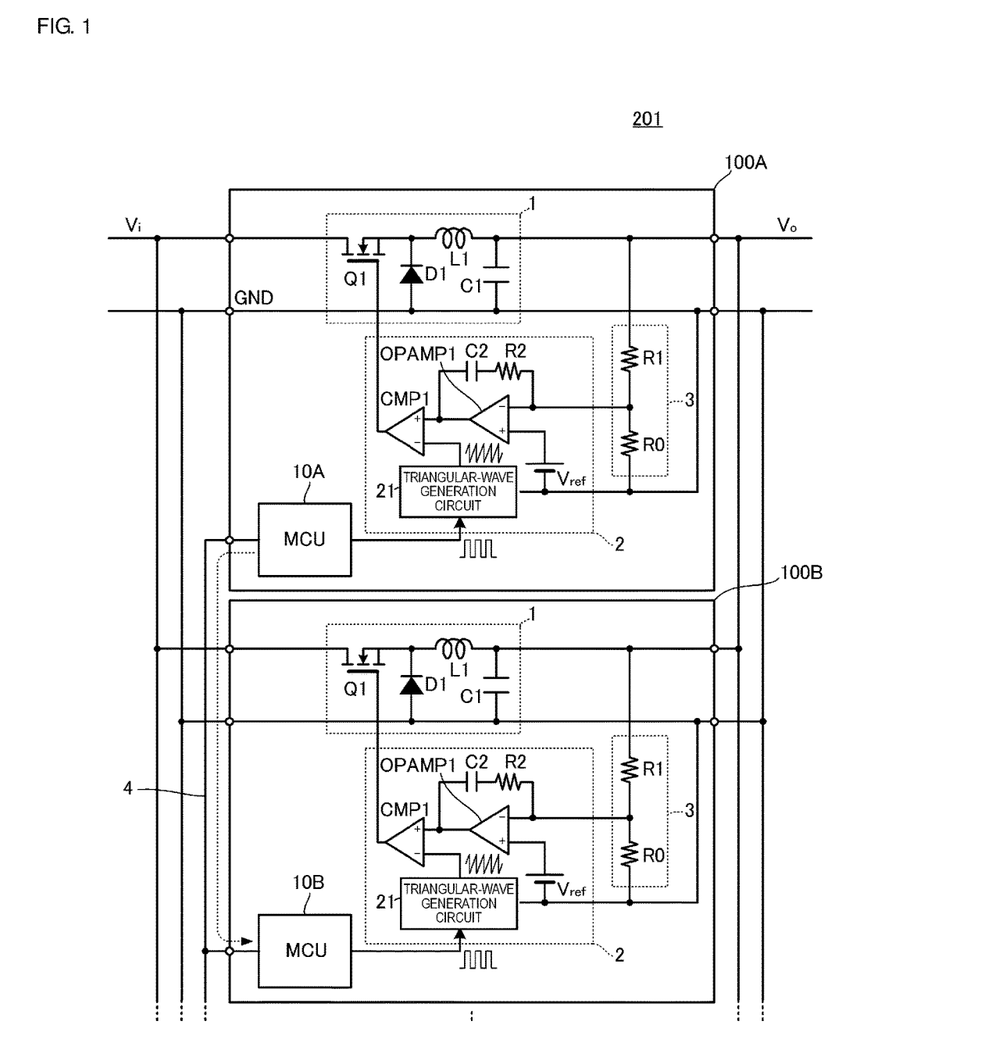
FIG. 1 is a circuit diagram of a power supply system according to a first preferred embodiment of the present invention.

FIG. 1 is a circuit diagram of a power supply system according to a first preferred embodiment of the present invention. This power supply system 201 includes a plurality of power supply apparatuses (hereinafter, also simply called "apparatuses") 100A, 100B, ... and the inputs and outputs thereof are respectively connected in parallel with one another. In FIG. 1, illustration of the third apparatus and subsequent apparatuses are omitted. The apparatuses 100A, 100B, ... basically have the same configuration.

When the apparatus 100A is taken as an example, the apparatus 100A includes a converter 1, a PWM controller 2, a controller 10A, and an output voltage detection circuit 3. The converter 1 includes a switch device Q1, a diode D1, an inductor L1, and a capacitor C1, which define a non-insulating step-down converter circuit. The PWM controller 2 includes an error amplifier OPAMP1, a PWM comparator CMP1, and a triangular-wave generation circuit 21. The PWM controller 2 and the controller 10A define a "switching control circuit".

The output voltage detection circuit 3 is a voltage divider circuit including resistors R1 and R0. The error amplifier OPAMP1 compares the output voltage of the output voltage detection circuit 3 with a reference voltage Vref, and supplies an error voltage to the non-inverting terminal of the PWM comparator CMP1. A capacitor C2 and a resistor R2 are connected between the inverting input terminal and output terminal of the error amplifier OPAMP1. This circuit defines and functions as a phase compensation circuit to prevent oscillation of the control system.

The controller 10A preferably is a micro-controller (MCU). The controller 10A supplies the triangular-wave generation circuit 21 with a square wave signal. The triangular-wave generation circuit 21, in synchronization with this square wave signal, generates a triangular-wave signal and supplies it to the inverting terminal of the PWM comparator CMP1. The PWM comparator CMP1, by comparing the triangular-wave signal with an input voltage input to the non-inverting terminal, supplies a PWM modulation signal to the switch device Q1.

The switch device Q1 is controlled by the PWM-modulated signal described above. An excitation current flows through the inductor L1 during the on period of the switch device Q1, and a return current flows through the diode D1 during the off period.

The controller 10A outputs a synchronization pulse signal to a synchronization pulse bus line 4. The above-described square wave signal is synchronized with the rising or falling edge of the synchronization pulse signal. In other words, the controller 10A not only outputs the synchronization pulse signal but also generates the square wave signal synchronized with the rising or falling edge of the synchronization pulse signal.

A controller 10B within the apparatus 100B receives the voltage level of the synchronization pulse bus line 4, generates a square wave signal which is in synchronization with the rising or falling edge of the voltage level, and supplies the square wave signal to a triangular-wave generation circuit 21.

Figure 2:
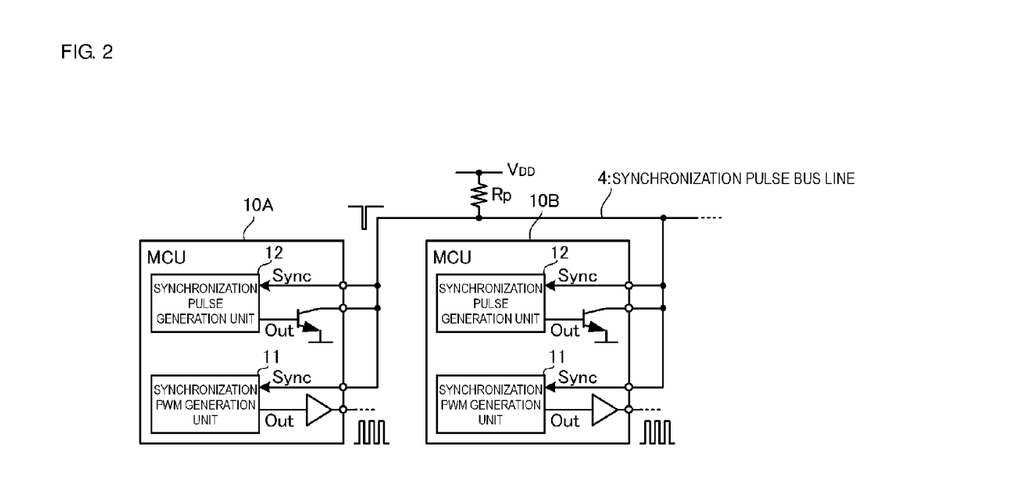
FIG. 2 is a diagram illustrating the circuits or functions within controllers represented by blocks.

FIG. 2 is a diagram illustrating the circuits or functions within the controllers represented by blocks. The controllers 10A, 10B, ... each include a synchronization PWM generator 11 and a synchronization pulse generator 12. The synchronization pulse generator of each power supply apparatus is connected to the synchronization pulse bus line 4. This bus line is pulled up by a resistor Rp. The output of the synchronization pulse generator 12 is of an open collector type. Hence, the synchronization pulse generator 12 is wired-OR connected in negative logic (wired-NOR connected in positive logic) to the synchronization pulse bus line 4.

The synchronization PWM generator 11 receives the signal of the synchronization pulse bus line 4 as a synchronization signal and generates a square wave signal synchronized with this synchronization signal. The synchronization pulse generator 12 receives the signal of the synchronization pulse bus line 4 as a synchronization signal. Further, the synchronization pulse generator 12 sets the synchronization pulse bus line 4 to an L level by turning on a transistor of the output. The operation of the synchronization pulse generator 12 will be described in detail later.

Figure 3:
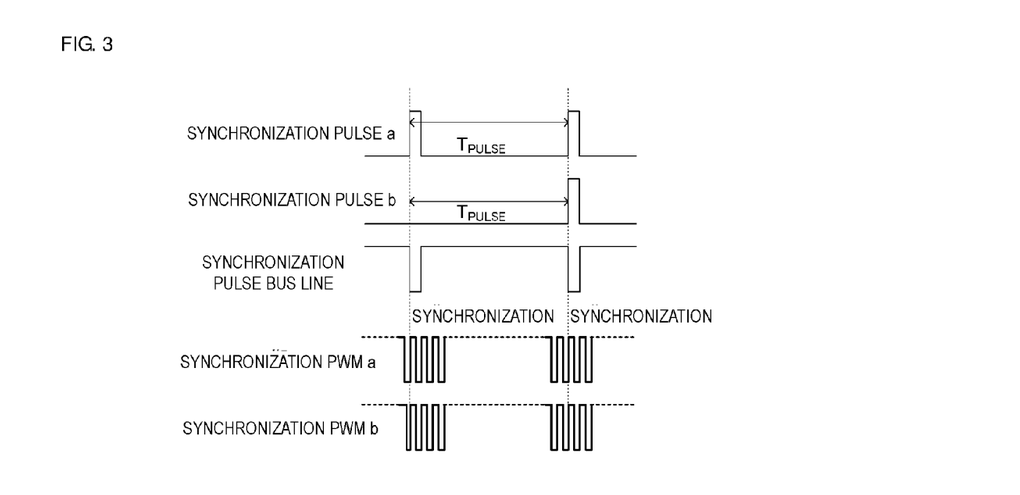
FIG. 3 is a waveform diagram of signals generated by a synchronization pulse generator and a synchronization PWM generator.

FIG. 3 is a waveform diagram of signals generated by the synchronization pulse generator 12 and the synchronization PWM generator 11 described above. The synchronization pulses have a longer cycle than square wave signals for PWM. In the case in which synchronization among the power supply apparatuses has not yet been realized, for example, right after activation, the controller of one of the power supply apparatuses outputs a synchronization pulse signal. As a result, the level of the synchronization pulse bus line 4 is made to fall from an H level to an L level, and the synchronization pulse and the synchronization PWM (square wave signal) are synchronized with this falling edge. As illustrated in the example of FIG. 3, in the case of a configuration in which the synchronization pulse generator 12 within the controller of each power supply apparatus generates a synchronization pulse with a fixed cycle $T_{PULSE}$, once synchronization has been realized, the synchronization pulse generator 12 within the controller of each power supply apparatus generates a synchronization pulse at the same time. When the cycles of synchronization pulses generated by the synchronization pulse generators 12 are different among the power supply apparatuses, the synchronization pulse generators 12 are synchronized with the synchronization pulse generated by the synchronization pulse generator 12 having the shortest cycle.

Figure 4:
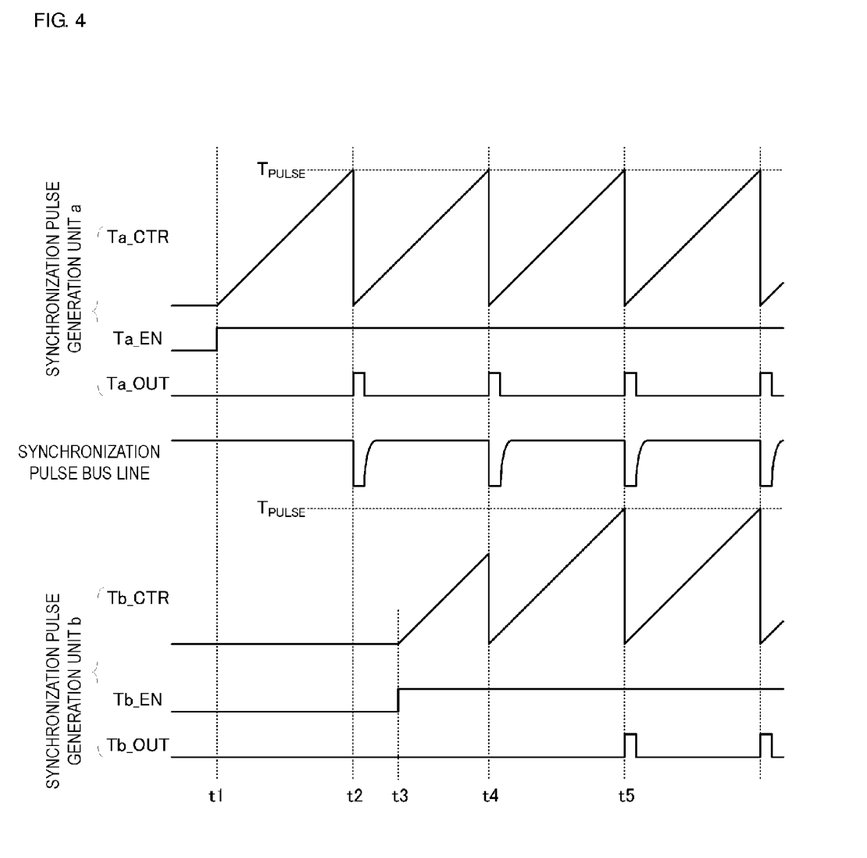
FIG. 4 is a waveform diagram illustrating the states of synchronization pulse generators and the level of a synchronization pulse bus line.

FIG. 4 is a waveform diagram illustrating the states of the synchronization pulse generators 12 and the voltage level of the synchronization pulse bus line 4. The meanings of the signals are as follows.

Tx_CTR A counter of the timer of a synchronization pulse generator x.

Tx_EN An operation permission bit of the synchronization pulse generator x. This level becomes high after the completion of initialization processing subsequent to activation of an MCU.

Tx_OUT An output of the synchronization pulse generator x (synchronization pulse x).

The operation of the synchronization pulse generator is as follows.

The value of Tx_CTR is cleared when Tx_CTR counts up $T_{PULSE}$.

When clearing is generated due to counting up in Tx_CTR, one-shot pulse Tx_OUT is generated.

When a falling edge of the synchronization pulse bus line 4 is detected, the value of Tx_CTR is cleared.

The operations at respective timings in FIG. 4 are as follows.

t1: The initialization of a synchronization pulse generator a is finished, the operation of the synchronization pulse generator a is permitted, and the counting up of Ta_CTR is started.

t2: Ta_CTR reaches $T_{PULSE}$ and is cleared, then Ta_OUT is output. Ta_CTR is also cleared by Ta_OUT, but since this happens at the same time as clearing caused by counting up, no influence due to synchronization is apparently observed. The rising of the waveform of the synchronization pulse bus line 4 not being sharp represents a charging action for parasitic capacitance of the synchronization pulse bus line 4.

t3: The initialization of a synchronization pulse generator b is finished and the operation of the synchronization pulse generator b is permitted, whereby counting up of Tb_CTR is started.

t4: Ta_CTR reaches $T_{PULSE}$ and is cleared, whereby Ta_OUT is output. The synchronization pulse generator b detects falling of the synchronization pulse bus line 4 and clears Tb_CTR. Since this is not clearing due to counting up, Tb_OUT is not generated at this time.

t5: Ta_CTR and Tb_CTR reach $T_{PULSE}$ and are cleared. Ta_OUT and Tb_OUT are output, the synchronization pulse bus line 4 falls, and all the synchronization pulse generators are synchronized with one another.

Then, processing of t4 and t5 is repeated.

In this way, by performing synchronization control of the power supply apparatuses through the synchronization pulse bus line to which they are wired-OR connected, the power supply apparatuses are able to be synchronized with one another without distinguishing between master and slave.

Further, since the synchronization pulses have a longer cycle than the square wave signals for PWM, signal distortion and generation/reception of noise caused by the synchronization pulse bus line are significantly reduced or prevented.

Second Preferred Embodiment

In a second preferred embodiment of the present invention, when a first synchronization pulse generator has been synchronized with a synchronization pulse output from a second synchronization pulse generator of another power supply apparatus, the synchronization pulse generation cycle of the first synchronization pulse generator is set to be longer than the cycle of the synchronization pulse with which synchronization has been performed. The circuit configuration of the power supply system according to the second preferred embodiment is the same as the one illustrated in FIG. 1.

Figure 5:
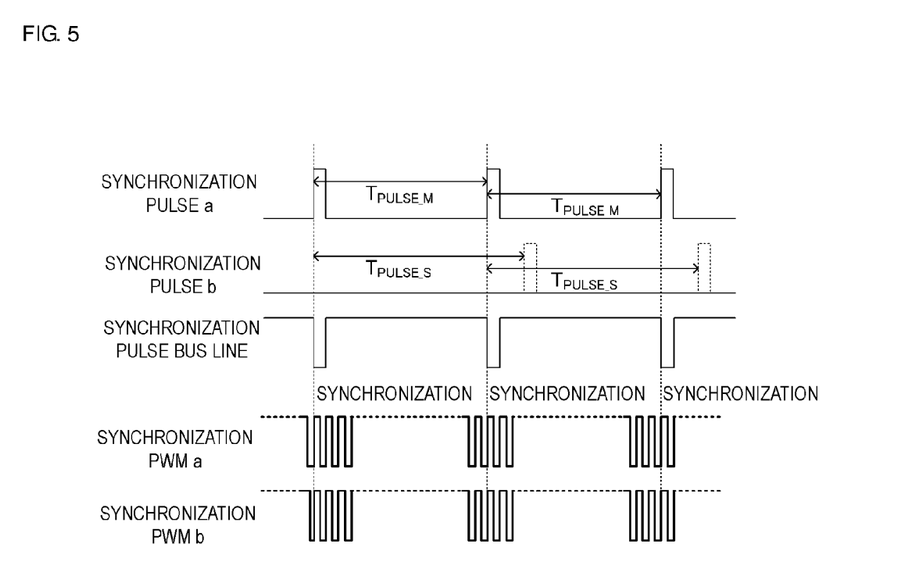
FIG. 5 is a waveform diagram illustrating signals generated by the synchronization pulse generators and the synchronization PWM generators in a power supply system according to a second preferred embodiment of the present invention.

FIG. 5 is a waveform diagram illustrating signals generated by the synchronization pulse generators and the synchronization PWM generators. As in the example illustrated in this figure, when the cycle of a synchronization pulse generated by a synchronization pulse generator varies with the power supply apparatus, synchronization pulse generators are synchronized with one another by a synchronization pulse generated by a synchronization pulse generator corresponding to the minimum cycle ($T_{PULSE\_M}$). For example, even a controller including a synchronization pulse generator generating a synchronization pulse with a cycle ($T_{PULSE\_S}$) is to be synchronized with a synchronization pulse generated by the synchronization pulse generator corresponding to the minimum cycle ($T_{PULSE\_M}$).

In this way, the power supply apparatus (master) that once generated a synchronization pulse has a shorter synchronization pulse generation cycle than other power supply apparatuses (slaves) after that and, hence, thereafter, a synchronization pulse is always generated by the power supply apparatus which has become the master. If the master stops operation, synchronization is performed by another power supply apparatus which has been operating as a slave, and this apparatus becomes the master.

Note that when a plurality of power supply apparatuses have been activated at the same time, a state may be entered where a plurality of power supply apparatuses become the master at the same time and generate synchronization pulses with $T_{PULSE\_M}$. In such a case, it is only required that $T_{PULSE\_M}$ be varied randomly below $T_{PULSE\_S}$ rather than making $T_{PULSE\_M}$ be fixed. As a result, only a single power supply apparatus can become the master.

According to the present preferred embodiment, the power supply apparatuses, although preferably having the same configuration, can be divided into a master and slaves in operations.

Third Preferred Embodiment

Figure 6:
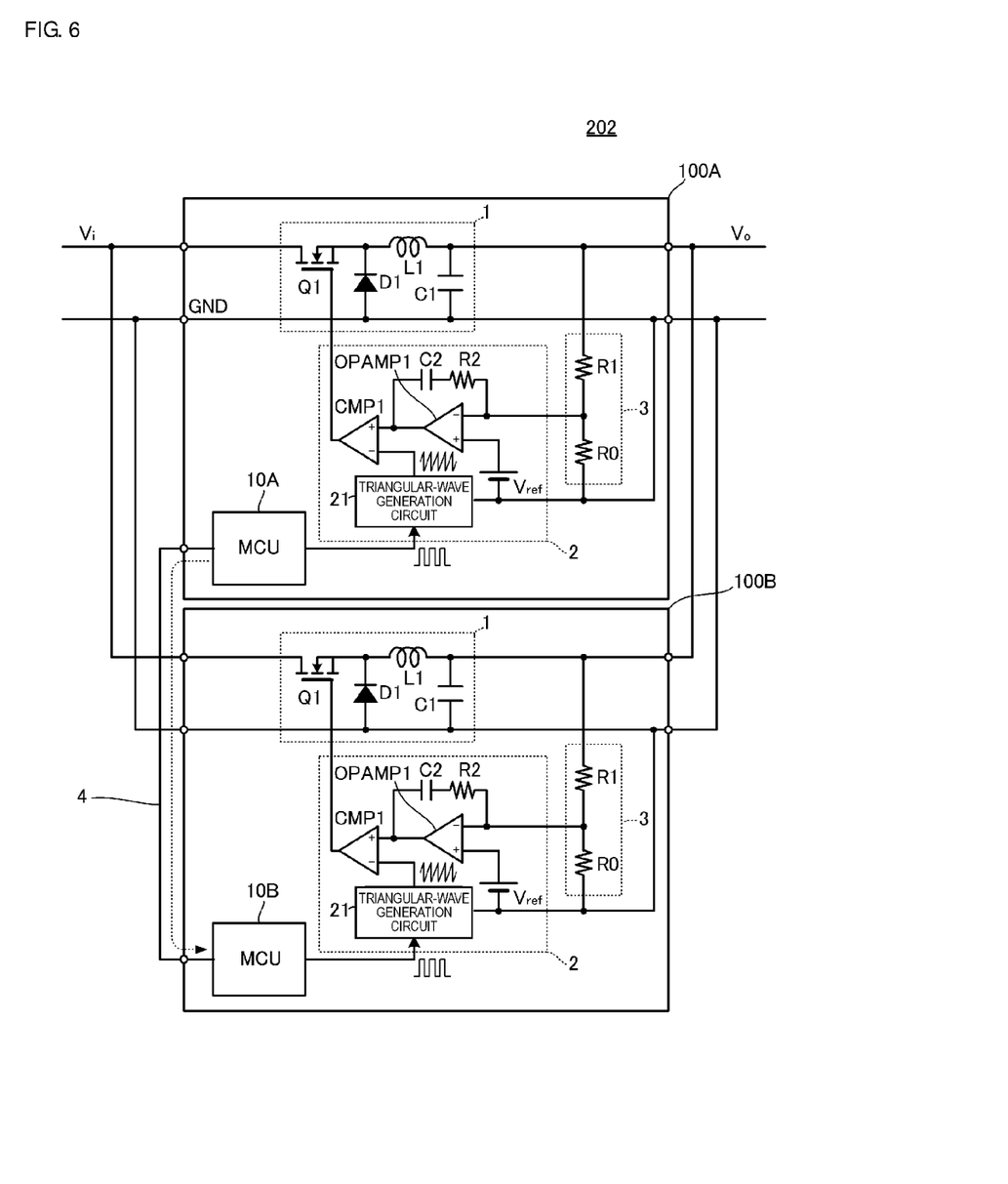
FIG. 6 is a circuit diagram of a power supply system according to a third preferred embodiment of the present invention.

FIG. 6 is a circuit diagram of a power supply system according to a third preferred embodiment of the present invention. This power supply system 202 includes two apparatuses 100A and 100B, and the inputs and outputs thereof are respectively connected in parallel with each other. The basic configuration of these two apparatuses 100A and 100B is the same as that of the apparatuses 100A and 100B illustrated in FIG. 1, except for the operation of the controller which operates as a slave differently.

Figure 7:
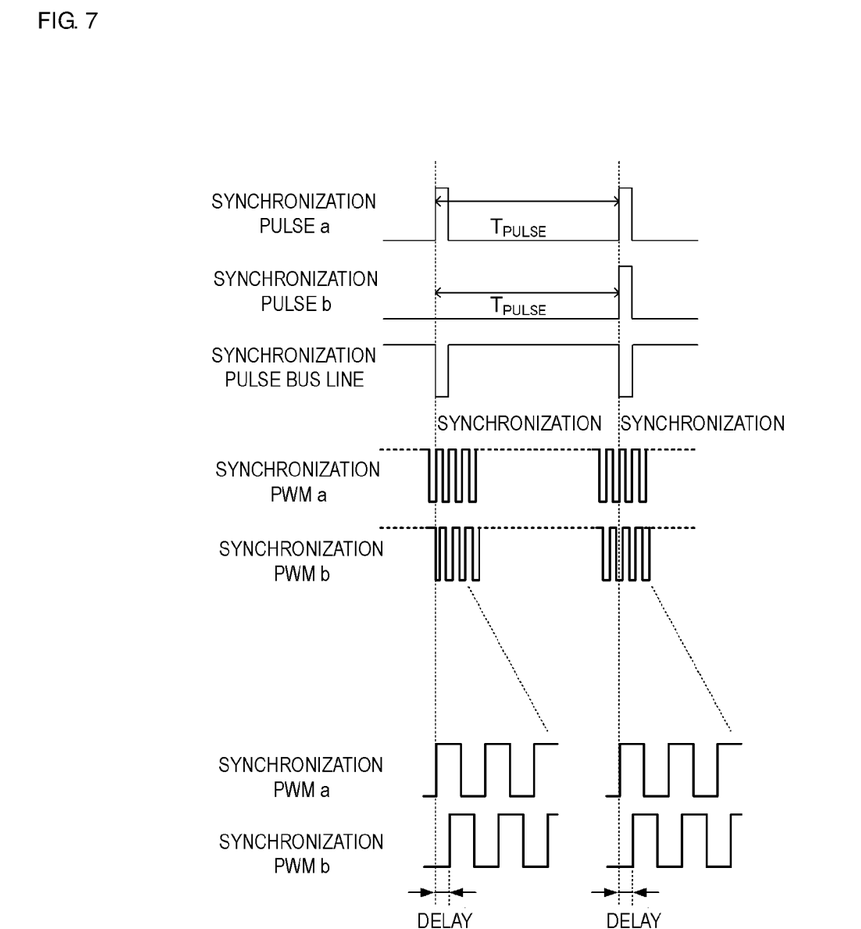
FIG. 7 is a waveform diagram illustrating the operation of the power supply system according to the third preferred embodiment of the present invention.

FIG. 7 is a waveform diagram illustrating the operation of the power supply system according to the third preferred embodiment. The waveform of a synchronization-PWM-b signal generated by the synchronization PWM generator of the controller 10B is different from that of the example illustrated in FIG. 3. In the present example, the synchronization-PWM-b signal generated by the synchronization PWM generator 11 in the controller 10B or the like operating as a slave rises with a fixed delay after the falling edge of the synchronization pulse bus line. This delay time may be realized by making an apparatus (100A in the present example) operating as the master and an apparatus (100B in the present example) operating as a slave perform an interleaved operation through advance setting, or by making an apparatus operating as the master send an instruction to an apparatus operating as a slave through serial communication or other methods.

Figure 8:
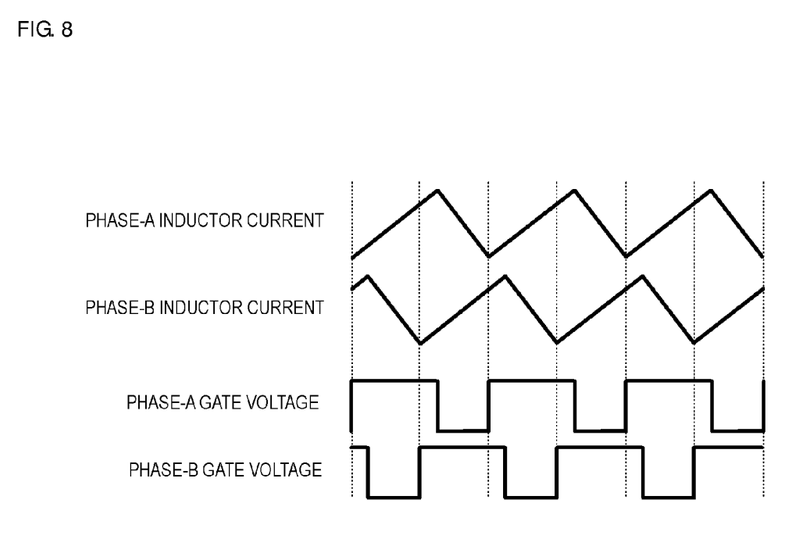
FIG. 8 is a waveform diagram illustrating an interleaving operation.

FIG. 8 is a waveform diagram illustrating an interleaving operation. Here, when phase A represents the phase of the switching operation of the apparatus 100A and phase B represents the phase of the switching operation of the apparatus 100B, the inductor currents and gate voltages corresponding to phase A and phase B have the waveforms as illustrated in FIG. 8. There is a phase difference between a phase-A voltage (gate voltage of the switch device Q1 in the apparatus 100A) and a phase-B voltage (gate voltage of the switch device Q1 in the apparatus 100B). As a result, a phase difference is generated between a phase-A inductor current (current flowing through the inductor L1 in the apparatus 100A) and a phase-B inductor current (current flowing through the inductor L1 in the apparatus 100B), and an interleaving operation is performed. As a result, ripple components in the output current are significantly reduced or prevented.

Note that, not limited to a two-phase interleaving operation, a multiphase operation with three or more phases can also be similarly realized. In other words, by providing a plurality of slave apparatuses, a plurality of different delay times for synchronization PWM generators of the controllers in the plurality of apparatuses may be set, or an instruction may be given from a master to slaves using a serial signal. For example, two types of delay time will allow a three-phase multiphase operation to be realized.

Other Preferred Embodiments

In the preferred embodiments described above, examples have been shown in which the converter preferably includes a non-insulating step-down converter circuit. However, the converter may include a step-up converter or a step-up and step-down converter. Further, an insulating converter including an insulating transformer may be used. Further, although an example of analog control has been shown in which a PWM controller preferably is realized by the combination of an error amplifier, a PWM comparator, and passive devices, this may be digital control realized by MCU processing.

In the preferred embodiments described above, the output of a synchronization pulse generator is of an open collector type. However, this may be of an open drain type in the case where the output of the synchronization pulse generator includes a MOS-FET circuit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply system comprising:
a plurality of power supply apparatuses including inputs and outputs that are respectively connected in parallel, each of the plurality of power supply apparatuses including:
a converter that performs power conversion;
a synchronization pulse generator that generates a synchronization pulse for synchronization of a switching cycle; and
a switching control circuit that performs switching control of a switch device in synchronization with the synchronization pulse; and
a synchronization pulse bus line connecting the synchronization pulse generators and synchronization signal inputs of the switching control circuits; wherein
the synchronization pulse generators are wired-OR connected to the synchronization pulse bus line in an open collector structure or an open drain structure;
the synchronization pulse generators each generate the synchronization pulse in synchronization with rising or falling of the synchronization pulse bus line; and
a cycle time of the synchronization pulse is an integer multiple of a cycle time of the switching cycle.

2. The power supply system according to claim 1, wherein the synchronization pulse generator of one of the power supply apparatuses, when the switching control circuit of the one of the plurality of power supply apparatuses is synchronized with the synchronization pulse output from the pulse generator of another one of the plurality of power supply apparatuses, sets a generation cycle of the synchronization pulse to be longer than a cycle of a synchronization pulse output from the synchronization pulse generator of the another one of the plurality of power supply apparatuses.

3. The power supply system according to claim 1, wherein the switching control circuit of at least one of the plurality of power supply apparatuses sets a fixed delay time between a rising or falling edge of the synchronization pulse and switching of the switch device.

4. The power supply system according to claim 1, wherein each of the plurality of power supply apparatuses have a same structure.

5. The power supply system according to claim 1, wherein each of the plurality of power supply apparatuses includes a PWM controller and an output voltage detector.

6. The power supply system according to claim 5, wherein the PWM controller includes an error amplifier, a PWM comparator and a triangular wave generation circuit.

7. The power supply system according to claim 5, wherein the output voltage detector includes resistors.

8. The power supply system according to claim 1, wherein the converter includes a switch, a diode, an inductor, and a capacitor connected to define a non-insulating step-down converter.

9. The power supply system according to claim 1, wherein the plurality of power supply apparatuses are divided into a master and slaves.

10. The power supply system according to claim 1, wherein the power supply system operates in a two-phase interleaving operation mode.

11. The power supply system according to claim 1, wherein the power supply system operates in a multi-phase interleaving operation mode including three or more phases.

12. The power supply system according to claim 1, wherein the converter is one of a non-insulating step-down converter, a step-up converter, a step-down converter, and an insulating converter.

13. A power supply apparatus that is one of a plurality of power supply apparatuses with inputs and outputs being respectively connected in parallel to define a power supply system, the power supply apparatus comprising:
a converter that performs power conversion; and
a synchronization pulse generator that generates a synchronization pulse for synchronization of a switching cycle; and a switching control circuit that performs switching control of a switch device in synchronization with the synchronization pulse; wherein the power supply system includes a synchronization pulse bus line connecting the synchronization pulse generators and synchronization signal inputs of the switching control circuits;

the synchronization pulse generators are wired-OR connected to the synchronization pulse bus line in an open collector structure or an open drain structure;

the synchronization pulse generators each generate the synchronization pulse in synchronization with rising or falling of the synchronization pulse bus line; and a cycle time of the synchronization pulse is an integer multiple of a cycle time of the switching cycle.

14. The power supply apparatus according to claim 13, wherein the switching control circuit sets a fixed delay time between a rising or falling edge of the synchronization pulse and switching of the switch device.

15. The power supply apparatus according to claim 13, further comprising a PWM controller and an output voltage detector.

16. The power supply apparatus according to claim 15, wherein the PWM controller includes an error amplifier, a PWM comparator and a triangular wave generation circuit.

17. The power supply apparatus according to claim 15, wherein the output voltage detector includes resistors.

18. The power supply apparatus according to claim 13, wherein the converter includes a switch, a diode, an inductor, and a capacitor connected to define a non-insulating step-down converter.

19. The power supply apparatus according to claim 13, wherein the converter is one of a non-insulating step-down converter, a step-up converter, a step-down converter, and an insulating converter.

* * * * *